(12) United States Patent
Plow

(10) Patent No.: US 6,536,644 B2
(45) Date of Patent: Mar. 25, 2003

(54) TOOL-LESS FEEDROLL FOR WIRE FEEDER

(75) Inventor: Daniel Plow, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 85 days.

(21) Appl. No.: 09/808,574

(22) Filed: Mar. 14, 2001

(65) Prior Publication Data

US 2002/0130153 A1 Sep. 19, 2002

(51) Int. Cl.[7] .......................... B65H 20/00; B25G 3/28; F16B 7/20
(52) U.S. Cl. ................ 226/190; 226/181; 226/188; 403/349; 403/354
(58) Field of Search .................. 226/179, 181, 226/188, 190, 194; 403/348, 349, 354, 355

(56) References Cited

U.S. PATENT DOCUMENTS

| 2,730,876 | A | * | 1/1956 | Russell ...................... 403/354 |
| 3,632,959 | A | | 1/1972 | Nelson et al. |
| 3,652,823 | A | | 3/1972 | Clemens et al. |
| 3,702,913 | A | | 11/1972 | Kazluaskas |
| 3,806,694 | A | | 4/1974 | Nelson et al. |
| 3,835,287 | A | | 9/1974 | Jonsson |
| 3,974,356 | A | | 8/1976 | Nelson et al. |
| 3,985,013 | A | * | 10/1976 | Pillon et al. .................. 72/160 |
| 4,048,861 | A | * | 9/1977 | Woidke et al. .............. 226/179 |
| 4,068,106 | A | | 1/1978 | Shaputis |
| 4,143,257 | A | | 3/1979 | Herrmann |
| 4,145,593 | A | | 3/1979 | Merrick et al. |
| 4,206,862 | A | | 6/1980 | DaCosta |
| 4,665,300 | A | | 5/1987 | Bellefleur |
| 4,804,813 | A | | 2/1989 | Tesch |
| 4,892,990 | A | | 1/1990 | Acheson |
| 4,902,162 | A | * | 2/1990 | Watt ........................... 403/354 |
| 4,917,525 | A | * | 4/1990 | Duncan ....................... 403/349 |
| 5,155,332 | A | | 10/1992 | Maguire |
| 5,249,760 | A | * | 10/1993 | Morimoto .................... 403/348 |
| 5,298,710 | A | | 3/1994 | Acheson et al. |
| 5,491,321 | A | | 2/1996 | Stuart et al. |
| 5,584,426 | A | | 12/1996 | Ziesenis |
| 5,800,088 | A | * | 9/1998 | Luckhof et al. ............. 403/348 |
| 6,066,833 | A | | 5/2000 | Rigdon et al. |
| 6,318,614 | B1 | * | 11/2001 | Boyd .......................... 226/181 |

\* cited by examiner

Primary Examiner—Michael R. Mansen
(74) Attorney, Agent, or Firm—John H. Pilarski; Mark W. Croll

(57) ABSTRACT

A wire feeder comprises a feedroll with through slots that open into a bore and that extend between the feedroll ends. The feedroll has blind slots in the ends that also open into the bore. A shaft on the wire feeder has a radial pin. The feedroll is assembled on the shaft by angularly aligning the through slots with the pin and pushing the feedroll onto the shaft against a spring until the feedroll is past the pin. The feedroll is rotated on the shaft until the blind slots align with the pin. Then the feedroll is released to enable the blind slots to engage the pin under the force of the spring. The feedroll may be assembled to the shaft either in a manner that takes up any end play of the shaft, or that enables the feedroll and shaft to float through the end play.

26 Claims, 4 Drawing Sheets

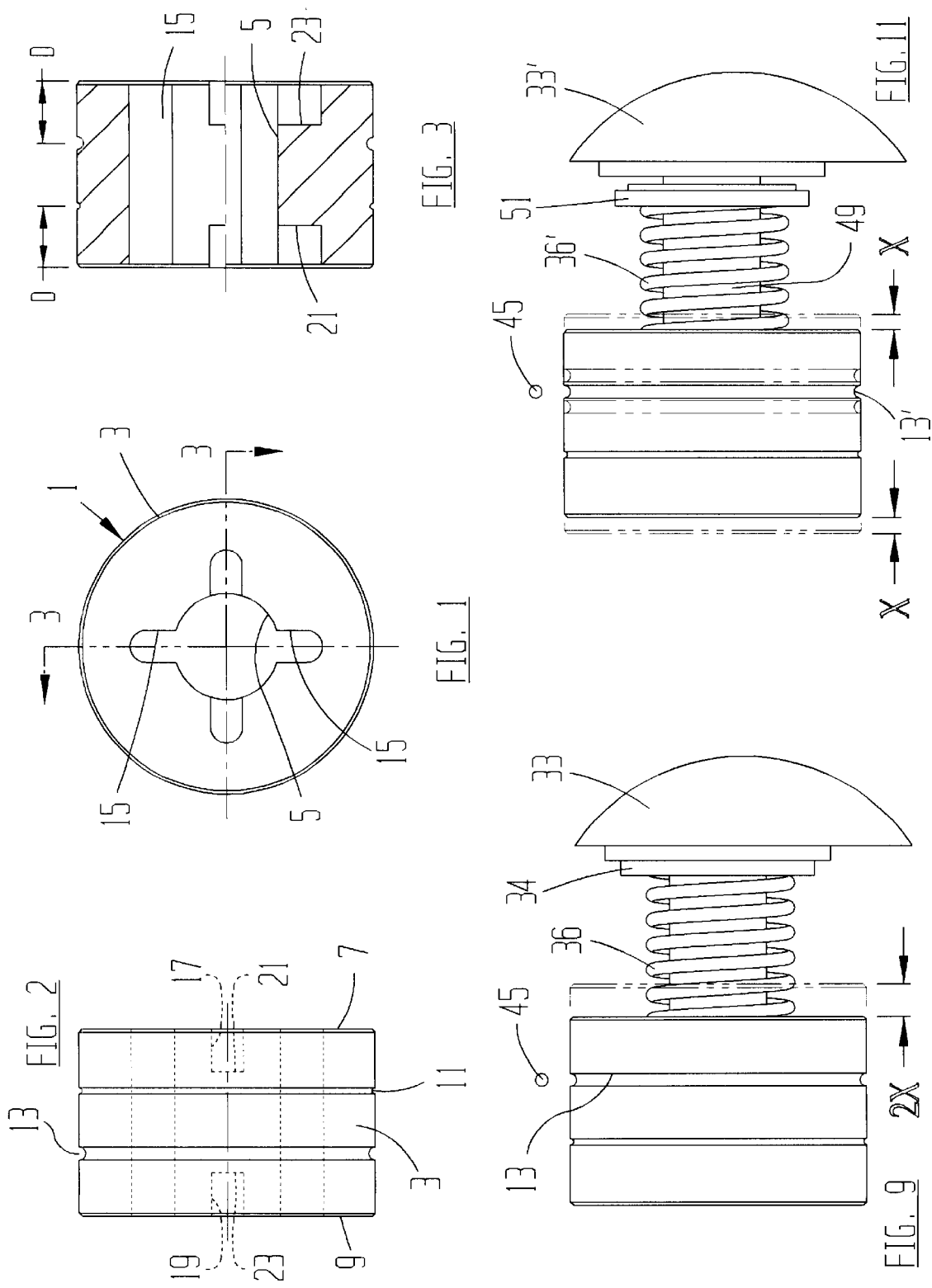

TOOL-LESS FEEDROLL FOR WIRE FEEDER

BACKGROUND OF THE INVENTION

1. Field of the Invention

This invention pertains to welding machines, and more particularly to apparatus that feeds a weld wire in electric arc welding machines.

2. Description of the Prior Art

An important part of MIG welding machines is the mechanism that feeds the weld wire to the welding gun. The wire feeder mechanism must be able to handle different materials and sizes of the weld wire to suit the workpieces to be welded and the welding operations to be performed. Typical sizes of weld wires range from approximately 0.023 inches to 0.052 inches in diameter. Typical materials for the weld wires include steel, stainless steel, and aluminum.

The weld wire feeder mechanism typically includes a small electric motor with a speed reducing gear drive. A bore of a feedroll fits over an output shaft of the speed reducer. The feedroll has an outer circumferential groove sized to suit a particular diameter weld wire. In a typical prior weld wire feeder mechanism, a radial pin in the speed reducer output shaft coacts with a slot in the feedroll to rotate the feedroll with the shaft. The feedroll is axially held on the shaft by a small screw that threads into the end of the shaft. The screw head or washer overlaps the feedroll around its bore to hold the feedroll on the shaft. A pressure roller presses against the feedroll to form a nip through which the weld wire passes when the feeder mechanism motor is energized.

Prior weld wire feeder mechanisms work very well, and they have gained widespread acceptance. Eventually, however, the circumferential groove in the feedroll wears. When that happens, the feedroll must be replaced. To do so, the screw on the end of the speed reducer output shaft is removed. That task typically requires the use of a tool, such as a screwdriver or wrench. When using the welding machine in the field, the necessary tool may not be available. In addition, the screw and related components are susceptible to being dropped and lost.

Thus, a need exists for improvements in the feedrolls of welding wire feeder mechanisms.

SUMMARY OF THE INVENTION

In accordance with the present invention, a toolless feedroll for a welding machine wire feeder is provided that is more quickly and efficiently changed than prior feedrolls. This is accomplished by apparatus that includes a spring that urges a blind slot in the feedroll to engage a radial pin on a shaft.

The shaft extends from a housing that is part of the wire feeder. The radial pin is located close to the free end of the shaft. The feedroll has an outer periphery with a circumferential groove. A bore in the feedroll is concentric with the outer periphery and fits snugly over the shaft. The feedroll also has a radial through slot opening into the bore and extending axially the full length of the feedroll. By aligning the through slot with the pin, the feedroll is able to slide over the shaft toward the wire feeder housing to be between the pin and the housing.

The feedroll also has a blind radial slot that opens into the bore. The blind slot is at the end of the feedroll that is opposite the wire feeder housing. By rotating the feedroll on the shaft until the blind slot is aligned with the pin, the feedroll can be slid away from the wire feeder housing such that the blind slot engages the pin. The spring is placed between the feedroll and the housing to hold the feedroll in engagement with the pin. If desired, the pin can protrude diametrically from opposite sides of the shaft. In that case, there are two opposed through slots and two opposed blind slots in the feedroll.

When the feedroll has worn, it is necessary merely to push it toward the wire feeder housing against the spring until the blind slot is disengaged from the pin. The feedroll is then rotated on the shaft until the through slot is aligned with the pin. The feedroll is slid off the shaft and replaced with a new feedroll.

According to one aspect of the invention, the feedroll has two circumferential grooves for different size weld wires and a blind slot on both ends. When a different size weld wire is to be used, the feedroll is removed from the shaft. It is then reversed end-for-end and replaced on the shaft.

A modified embodiment of the invention accommodates any end play in the wire feeder shaft. The shaft includes a shoulder, such as a snap ring, close to the wire feeder housing. The spring contacts the shoulder instead of the housing. In that manner, the shaft and feedroll are free to float through the shaft end play. When the weld wire is laid in the feedroll groove, the feedroll and shaft float into proper alignment with the rest of the weld wire guide system.

The method and apparatus of the invention, using a combination of through and blind slots in a feedroll, thus simplifies the task of replacing worn feedrolls. No tools are needed for the replacement process, even though the feedroll is positively held on the shaft both axially and angularly.

Other advantages, benefits, and features of the present invention will become apparent to those skilled in the art upon reading the detailed description of the invention.

BRIEF DESCRIPTION OF THE DRAWINGS

FIG. 1 is an end view of the feedroll of the invention.

FIG. 2 is a front view of the feedroll.

FIG. 3 is a cross-sectional view taken along line 3—3 of FIG. 1.

FIG. 9 is a schematic side view of the invention.

FIG. 11 is a diagrammatic side view of the modified embodiment of FIG. 10.

DETAILED DESCRIPTION OF THE INVENTION

Figure 4:
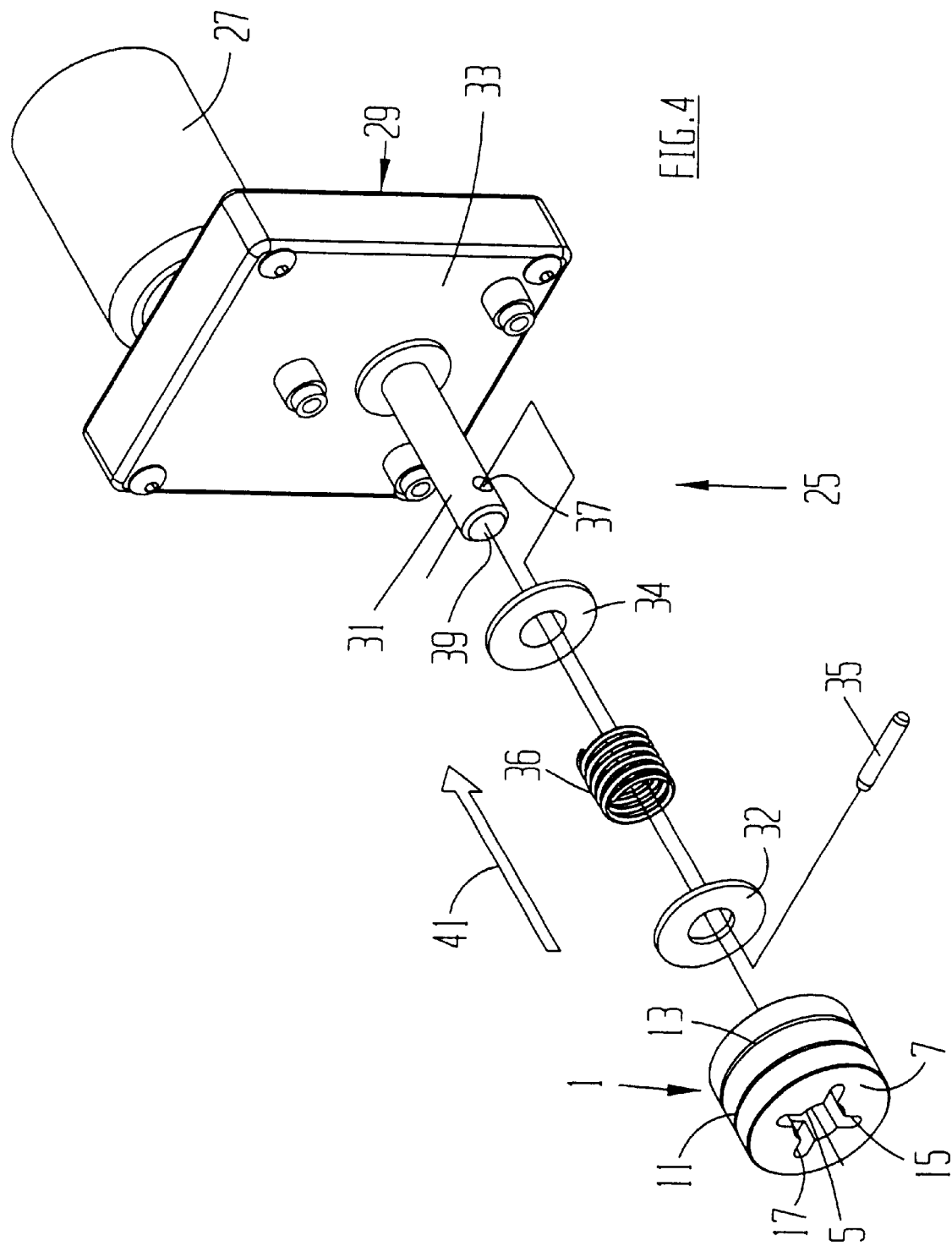
FIG. 4 is an exploded perspective view of the tool-less feedroll for wire feeder of the invention.
Figure 5:
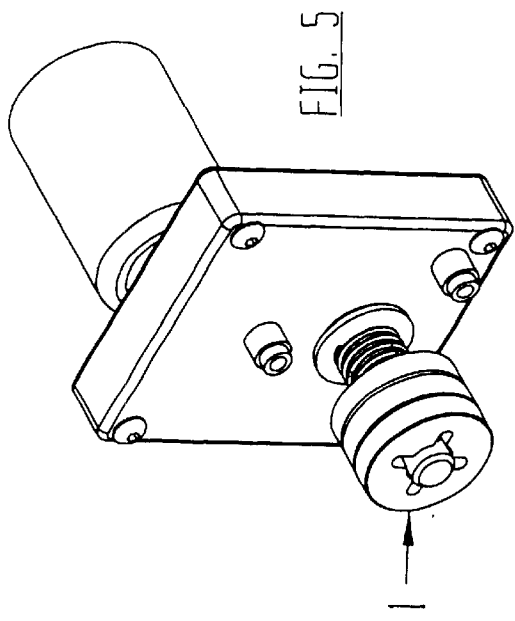
FIG. 5 is a perspective view of the assembled tool-less feedroll for wire feeder.
Figure 6:
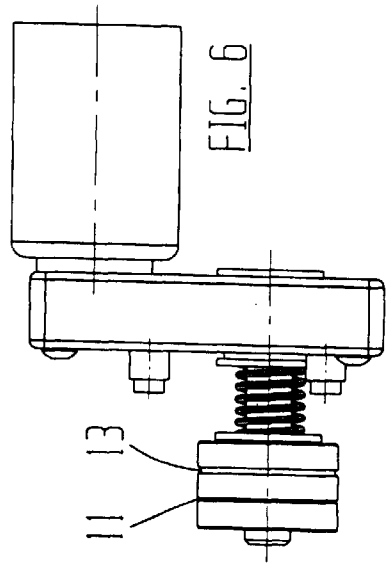
FIG. 6 is a side view of the assembled tool-less feedroll for wire feeder.
Figure 8:
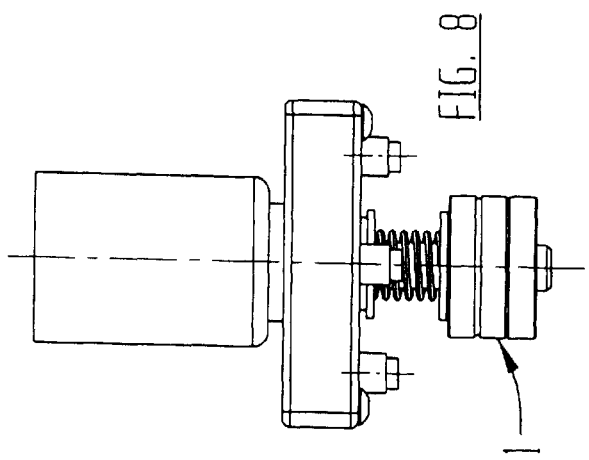
FIG. 8 is a top view of FIG. 7.
Figure 7:
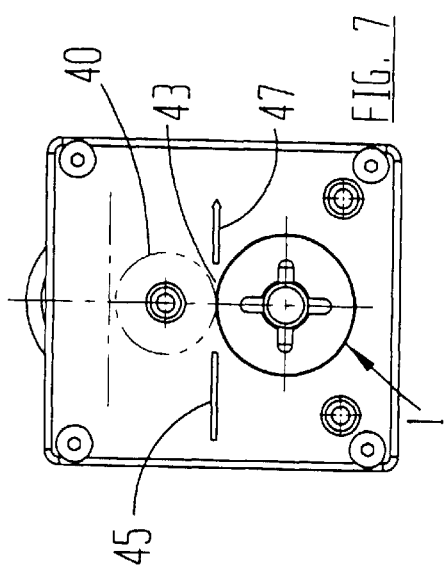
FIG. 7 is a front view of FIG. 6.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 1–3, a feedroll 1 is illustrated that includes the present invention. The feedroll 1 is particularly useful with a welding machine wire feeder to feed a weld wire to a welding gun, not shown.

The feedroll 1 has a round outer periphery 3 and a concentric bore 5, a first end 7, and a second end 9. There is a first circumferential groove 11 in the outer periphery 3 at a set distance D from the first end 7. There is a second circumferential groove 13 in the outer periphery at the distance D from the second end 9. The grooves 11 and 13 are preferably semi-circular in shape. Typical sizes for the grooves are 0.03 inches, 0.035 inches, and 0.045 inches in diameter. Those sizes for the grooves correspond to the sizes of the weld wires that are to be driven in cooperation with a pressure roller 40.

There are a pair of diametrically opposed through slots 15 extending between the feedroll ends 7 and 9. Each through slot 15 opens into the bore 5. The feedroll 1 also has a pair of blind slots at each end. Particularly, a first pair of diametrically opposed blind slots 17 are at the first end, and a second pair of diametrically opposed blind slots 19 are at the second end. The blind slots 17 and 19 open into the bore. The first blind slots terminate at coplanar bottom surfaces 21; the second blind slots terminate at coplanar bottom surfaces 23. The surfaces 21 and 23 are at equal respective distances from the first and second feedroll ends 7 and 9, respectively. Although the through slots are shown as being at 90 degrees angularly to the blind slots, other angles between the through and blind slots are also acceptable.

Turning to FIGS. 4–8, the feedroll 1 is shown in conjunction with a wire feeder 25. In the particular wire feeder 25 illustrated, it comprises an electric motor 27 mounted to a speed reducer 29. The speed reducer 29 has a output shaft 31 that projects from a housing 33. A pin 35 is pressed into a radial hole 37 in the shaft 31 near its free end 39. Preferably, the pin 35 protrudes diametrically outwardly from opposite sides of the shaft. The diameter of the pin 35 is slightly less than the width of the feedroll slots 15 and 17.

The wire feeder 25 further comprises a pair of washers 32 and 34 with a compression spring 36 therebetween placed over the shaft 31. The washers 32 and 34 and the spring 36 are captured on the shaft by the pin 35.

The feedroll 1 is assembled to the shaft 31 by first determining which of the grooves 11 or 13 is to be used for the particular weld wire to be fed. In the illustrated example, the groove 13 is to be used. The feedroll is placed concentric with the shaft, with the groove 13 closest to the wire feeder housing 33. The feedroll is angularly rotated until the through slots 15 are axially aligned with the pin 35. The feedroll bore 5 is slid over the shaft in the direction of arrow 41 against the washer 32 and the spring 36 until the feedroll end 7 is past the pin. Then the feedroll is rotated on the shaft until the blind slots 17 are aligned with the pin. The feedroll is allowed to slide away from the housing under the force of the spring until the slot surfaces 23 contact the pin. At that point, the feedroll is assembled on the shaft, and the blind slots 19 have engaged the pin. Energizing the motor 27 causes the shaft to rotate and positively drive the feedroll by the coaction of the pin and the drivewheel slots 17.

A pressure roller mechanism is also part of the wire feeder 25. The pressure roller mechanism includes the pressure roller 40 that cooperates with the feedroll 1 to form a nip 43. Other than the pressure roller 40, the pressure roller mechanism is not shown, because any of several conventional designs are useable with the wire feeder. All the various pressure roller mechanisms have the common function of applying an adjustable force against the feedroll at the nip 43, and the pressure roller mechanism forms no part of the present invention. In the wire feeder shown, the weld wire 45 is fed through the nip 43 in the direction of arrow 47 by the cooperation of the drivewheel peripheral groove 13 and the pressure roller.

When it is desired to remove the feedroll 1, the pressure roller 40 is removed from the vicinity of the shaft 31. The particular components and methods for removing the pressure roller will vary depending on the particular pressure roller mechanism used with the wire feeder 25. The feedroll is pushed in the direction of arrow 41 against the washer 32 and spring 36 until the blind slots 17 have disengaged from the pin 35. The feedroll is rotated on the shaft until the through slots 15 are aligned with the pin. The feedroll is allowed to slide off the shaft under the force of the spring until the washer 32 contacts the pin. The feedroll is then pulled the rest of the way off the shaft. The feedroll can then be replaced with a new one. Alternately, the feedroll can be reversed end-for-end to use the groove 11 for feeding the weld wire 45.

As described, the present invention is suitable for use with a wire feeder 25 in which the output shaft 31 has an end play of a few thousandths of an inch. The spring 36 acts against the wire feeder housing 33 to take up the end play, which is represented in exaggerated form as the distance 2X in FIG. 9.

Figure 10:
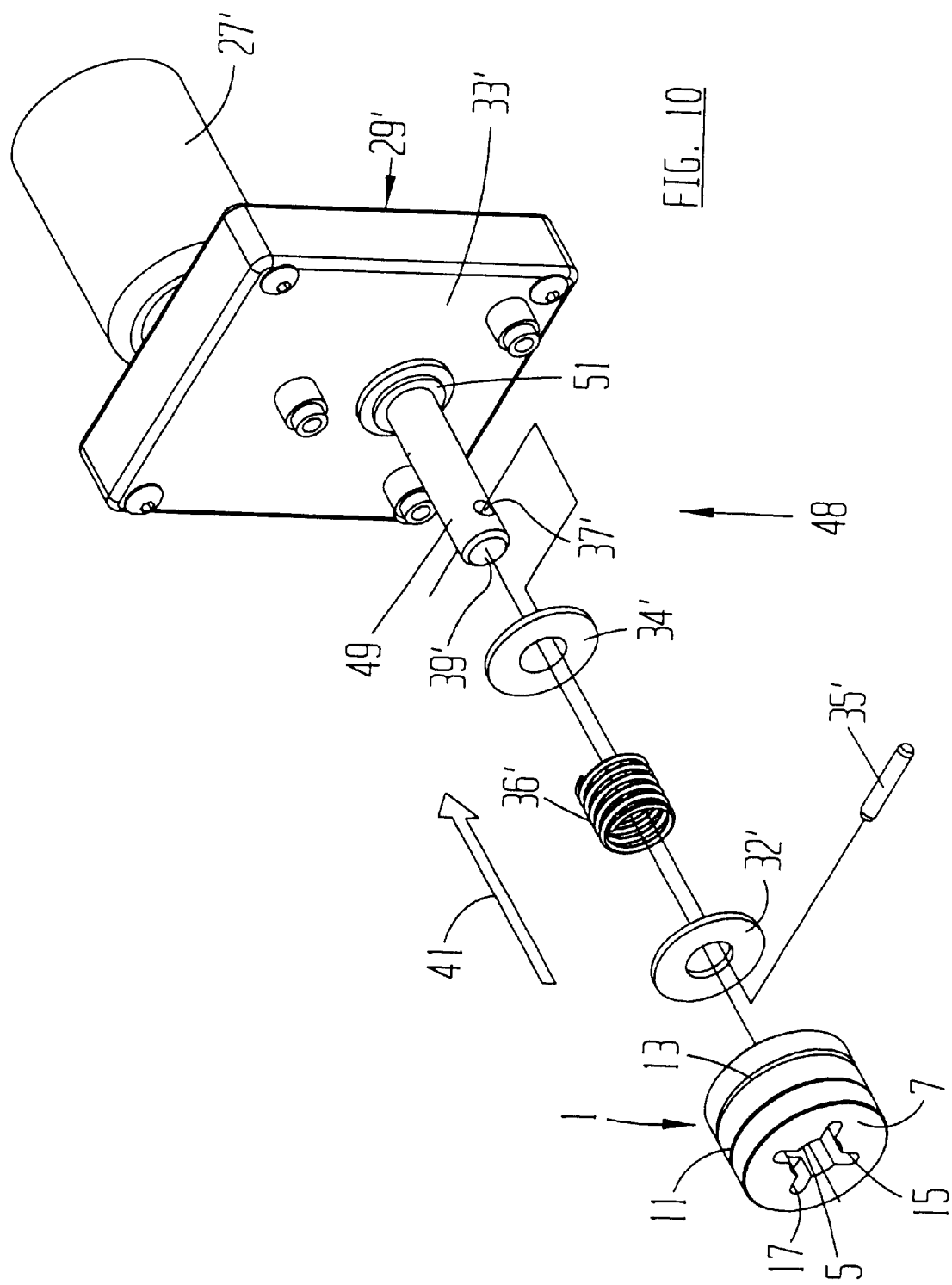
FIG. 10 is a view similar to FIG. 4, but showing a modified embodiment of the invention.

However, if the output shaft end play is more than a few thousandths of an inch, it is possible that the groove 13 (or groove 11) may not line up with the weld wire 45 from the feeder wire guide system. A modified embodiment of the invention is able to accommodate shaft end play of more than a few thousandths of an inch. FIGS. 10 and 11 show a wire feeder 48 with an output shaft 49. The output shaft 49 has a shoulder close to the wire feeder housing 33'. In the particular construction shown, the shoulder is in the form of a snap ring 51 installed in a suitable groove in the shaft 49. The spring 36' bears against the snap ring 51 or other shoulder. In that manner, the feedroll 1 is self-contained on the shaft 49 and is not dependent on the housing 33' for installation or operation. Accordingly, the shaft 49 and feedroll 1 are free to float axially through the shaft end play, represented by the dimensions X in FIG. 11. When a weld wire 45 is laid in the feedroll groove 13', for example, the feedroll 1 and shaft 49 float through the distances X so that the groove 13' is in proper alignment with the rest of the wire guide system. The result is a reliable wire feed system despite the end play in the shaft 49.

In summary, the results and advantages of welding wire machine wire feeders can now be more fully realized. The feedroll 1 is both assembled to and removed from the wire feeder 25 without the use of any tools. This desirable result comes from using the combined functions of the pin 35 and the feedroll slots 15, 17, and 9. The through slots 15 enable the feedroll to slide completely onto the shaft 31 past the pin. By first rotating the feedroll on the shaft to align one pair of the blind slots 17 or 19 with the pin and then releasing the feedroll, the spring 36 urges the blind slots into positive axial and angular engagement with the pin. The feedroll cooperates with a conventional pressure roller mechanism to feed the weld wire 45 when the motor 27 is energized. By using a shoulder on an output shaft having substantial end play, the feedroll and shaft are free to float to the proper alignment relative to the rest of the weld wire guide system.

It will also be recognized that in addition to the superior performance of the feedroll, its construction is such as to cost little if any more than traditional feedrolls. In fact, the convenience of assembling and disassembling the feedroll of the wife feeder 25 renders the invention more economical overall than prior weld wire feeders.

Thus, it is apparent that there has been provided, in accordance with the invention, a tool-less feedroll for wire feeder that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A welding machine feedroll for feeding a selected weld wire having a predetermined diameter, the feedroll having an outer periphery with at least one circumferential groove with a diameter corresponding to the predetermined diameter, a bore, and first and second ends, the feedroll defining at least one through slot extending between the first and second ends and opening into the bore, the feedroll further defining at least one first blind slot that opens into the bore at the first end and at least one second blind slot that opens into the bore at the second end.

2. A welding machine feedroll for feeding a selected weld wire having a predetermined diameter, the feedroll having an outer periphery with at least one circumferential groove with a diameter corresponding to the predetermined diameter, a bore, and first and second ends, the feedroll defining at least one through slot extending between the first and second ends and opening into the bore, the feedroll further defining two diametrically opposed first blind slots that open into the bore at the first end and two diametrically opposed second blind slots that open into the bore at the second end.

3. The welding machine feedroll of claim 2 wherein the first blind slots are angularly aligned about the bore with the second blind slots.

4. A wire feeder for feeding weld wire comprising:
 a. a shaft having first and second ends;
 b. means for rotating the shaft;
 c. a pin pressed radially in the shaft proximate the first end thereof;
 d. a feedroll assembled to the shaft, the feedroll comprising a periphery with at least one circumferential groove that receives a weld wire, a bore that receives the shaft, a first end proximate the shaft first end and a second end, the feedroll first end defining at least one first blind slot opening into the bore and in engagement with the pin, the feedroll further defining at least one through slot extending between the first and second ends and opening into the bore;
 e. means for biasing said at least one first feedroll blind slot into engagement with the pin; and
 f. means for cooperating with the feedroll to create a nip through which the weld wire is fed in response to rotating the shaft.

5. The wire feeder of claim 4 wherein the means for biasing comprises a spring on the shaft between the pin and the shaft second end.

6. The wire feeders of claim 5 wherein:
 a. the pin protrudes diametrically outwardly from opposite sides of the shaft;
 b. the feedroll first end defines two diametrically opposed blind slots both opening into the bore; and
 c. the pin engages the feedroll first blind slots.

7. The wire feeder of claim 6 wherein the feedroll second end defines a pair of diametrically opposed second blind slots that open into the bore.

8. The wire feeder of claim 7 wherein the first blind slots are angularly aligned about the bore with the second blind slots.

9. The wire feeder of claim 4 wherein the feedroll defines two diametrically opposed through slots that open into the bore.

10. The wire feeder of claim 4 wherein the feedroll second end defines at least one second blind slot that opens into the bore.

11. The wire feeder of claim 4 wherein the at least one first blind slot is angularly offset about the bore approximately 90 degrees from the through slot.

12. The wire feeder of claim 4 wherein the means for biasing comprises a shoulder on the shaft between the pin and the shaft second end, and a spring on the shaft between the pin and the shoulder.

13. The wire feeder of claim 4 wherein:
 a. the shaft has a predetermined amount of end play; and
 b. the means for biasing comprises a spring on the shaft between and coacting with the feedroll and the housing, so that the shaft end play is taken up by the spring.

14. The wire feeder of claim 4 wherein:
 a. the shaft has a predetermined amount of end play; and
 b. the means for biasing comprises a shoulder on the shaft between the pin and the shaft second end, and a spring on the shaft between and coacting with the feedroll and the shoulder,
 so that the feedroll and the shaft are free to float through the shaft end play.

15. The wire feeder of claim 14 wherein the shoulder on the shaft comprises a snap ring installed on the shaft.

16. A method of feeding a weld wire comprising the steps of:
 a. providing a housing with a shaft having a first end and a free end and a predetermined amount of end play;
 b. placing a spring on the shaft;
 c. pressing a pin radially into the shaft proximate the free end thereof and capturing the spring on the shaft;
 d. sliding a feedroll having first and second ends in a first direction onto the shaft and over the pin with the second end against the spring until the feedroll first end is between the pin and the shaft first end;
 e. rotating the feedroll on the shaft a predetermined angular distance;
 f. sliding the feedroll in a second direction and engaging the feedroll first end with the pin and thereby axially and angularly retaining the feedroll on the shaft;
 g. creating a nip between the feedroll and a pressure roller; and
 h. rotating the feedroll and feeding a weld wire through the nip in response to turning the shaft.

17. The method of claim 16 wherein:
 a. the step of pressing a pin in a shaft comprises the step of projecting the pin diametrically outwardly from opposite sides of the shaft; and
 b. the step of sliding a feedroll comprises the steps of:
  i. providing a feedroll with a pair of diametrically opposed through slots that open into the bore; and
  ii. sliding the feedroll through slots over the pin.

18. The method of claim 17 wherein:
 a. the step of sliding a feedroll comprises the step of providing the feedroll with at least one first blind slot in the first end thereof; and b. the step of engaging the feedroll first end with the pin comprises the step of engaging said at least one first blind slot with the pin.

19. The method of claim 18 comprising the further steps of:
   a. providing the feedroll with at least one second blind slot in the second end thereof;
   b. removing the feedroll from the shaft;
   c. reversing the feedroll end-for-end;
   d. sliding the feedroll in the first direction onto the shaft until the feedroll second end is between the pin and the shaft first end;
   e. rotating the feedroll on the shaft a predetermined angular distance; and
   f. sliding the feedroll in the second direction and engaging said at least one feedroll second slot with the pin and thereby axially and angularly retaining the feedroll on the shaft.

20. The method of claim 17 wherein:
   a. the step of sliding a feedroll comprises the step of providing the feedroll with a pair of first blind slots in the first end thereof; and
   b. the step of engaging the feedroll first end with the pin comprises the step of engaging the pair of first blind slots with the pin.

21. The method of claim 16 wherein:
   a. the step of placing a spring on the shaft comprises the step of placing the spring in operative association with the housing; and
   b. the step of sliding the feedroll in a second direction and engaging the feedroll first end with the pin comprises the step of taking up the shaft end play.

22. The method of claim 16 wherein the step of placing a spring on the shaft comprises the steps of installing a snap ring on the shaft proximate the housing, and placing the spring on the shaft in operative association with the snap ring,
   so that the feedroll and shaft are free to float through the shaft end play.

23. The method of claim 16 wherein:
   a. the step of providing a housing with a shaft comprises the step of providing a shaft with a shoulder thereon proximate the housing; and
   b. the step of placing a spring on the shaft comprises the step of placing the spring on the shaft in operative association with the shaft shoulder,
      so that the feedroll and shaft are free to float through the shaft end play.

24. A method of assembling a feedroll to a weld wire feeder having a housing and a shaft with first and second ends and a predetermined end play comprising the steps of:
   a. placing a spring on the shaft;
   b. pressing a pin radially into the shaft proximate the first end thereof and capturing the spring on the shaft;
   c. sliding a feedroll having first and second ends in a first direction onto the shaft and over the pin with the second end in operative association with the spring until the feedroll first end is between the pin and the shaft second end;
   d. rotating the feedroll on the shaft a predetermined angular distance; and
   e. sliding the feedroll in a second direction and engaging the feedroll first end with the pin and thereby axially and angularly retaining the feedroll on the shaft.

25. The method of claim 24 wherein:
   a. the step of placing a spring on the shaft comprises the step of placing the spring on the shaft in operative association with the housing; and
   b. the step of sliding the feedroll in a second direction and engaging the feedroll first end with the pin comprises the step of simultaneously taking up the shaft end play.

26. The method of claim 24 wherein:
   a. the step of placing a spring on the shaft comprises the steps of installing a snap ring on the shaft proximate the housing, and placing the spring on the shaft in operative association with the snap ring; and
   b. The step of sliding the feedroll in a second direction and engaging the feedroll first end with the pin comprises the step of enabling the feedroll and shaft to float together through the shaft end play.

* * * * *